US008818969B2

(12) United States Patent
Wada

(10) Patent No.: US 8,818,969 B2
(45) Date of Patent: Aug. 26, 2014

(54) INFORMATION PROCESSING APPARATUS AND SERVER, CONTROL METHOD, AND RECORDING MEDIUM

(75) Inventor: Yuki Wada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 35 days.

(21) Appl. No.: 13/299,776

(22) Filed: Nov. 18, 2011

(65) Prior Publication Data
US 2012/0136844 A1 May 31, 2012

(30) Foreign Application Priority Data

Nov. 26, 2010 (JP) .................................. 2010-264293
Nov. 1, 2011 (JP) .................................. 2011-240662

(51) Int. Cl.
G06F 17/30 (2006.01)
G06F 9/445 (2006.01)

(52) U.S. Cl.
CPC ....................................... G06F 8/65 (2013.01)
USPC .......................................................... 707/695

(58) Field of Classification Search
CPC ................... G06F 17/30011; G06F 17/30286; G06F 17/30067; G06F 17/30578; G06F 17/30575
USPC .......................................................... 707/695
See application file for complete search history.

(56) References Cited

U.S. PATENT DOCUMENTS

| 7,403,946 | B1 * | 7/2008 | Taylor ........................... 707/612 |
| 8,086,862 | B2 * | 12/2011 | Terao et al. .................... 713/181 |
| 2003/0217359 | A1 * | 11/2003 | Ohi et al. ....................... 717/174 |
| 2004/0045000 | A1 * | 3/2004 | Hara .............................. 717/178 |
| 2005/0138401 | A1 * | 6/2005 | Terao et al. .................... 713/189 |
| 2006/0048139 | A1 * | 3/2006 | Nakamura ..................... 717/174 |
| 2008/0294845 | A1 * | 11/2008 | Kawajiri ........................ 711/115 |
| 2011/0099547 | A1 * | 4/2011 | Banga ............................ 717/176 |
| 2011/0307879 | A1 * | 12/2011 | Ishida et al. ................... 717/170 |

FOREIGN PATENT DOCUMENTS

JP 4029448 1/2008

* cited by examiner

Primary Examiner — Sheree Brown
(74) Attorney, Agent, or Firm — Cowan, Liebowitz & Latman, P.C.

(57) ABSTRACT

A second program, which becomes inoperable as a result of updating of a first program and operates using the first program, is updated to an operable version using an appropriate update data file. When the version of the second program is not a version operable on the first program, one or more update data files including a full update data file which fully updates the second program to a version of the second program operable on the first program are determined as the update data files. When the version of the second program is a version operable on the first program, one or more differential update data files which do not include any full update data file and update some data files of the second program are determined as the update data files.

15 Claims, 9 Drawing Sheets

FIG. 3

| DEPENDENT PROGRAM VERSION | OPERATION OK/NG FOR EACH OS VERSION | | | | AVAILABILITY OF FULL UPDATE DATA FILE |
|---|---|---|---|---|---|
| | a | b | c | d | |
| 1.6 | × | × | ○ | ○ | × |
| 1.5 | × | × | ○ | ○ | ○ |
| 1.4 | × | ○ | ○ | × | × |
| 1.3 | × | ○ | ○ | × | ○ |
| 1.2 | ○ | ○ | × | × | × |
| 1.1 | ○ | ○ | × | × | ○ |
| 1.0 | ○ | × | × | × | × |

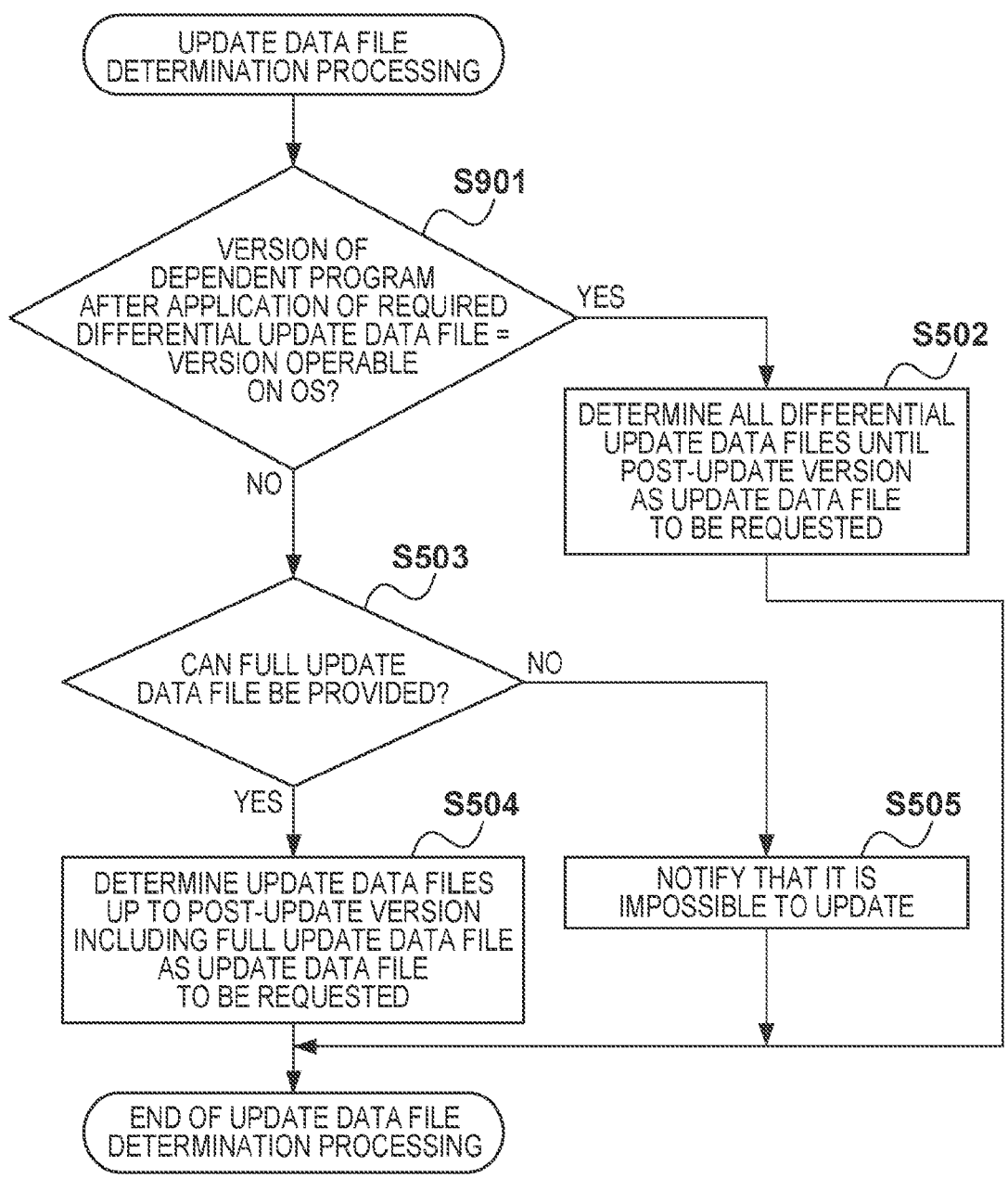

INFORMATION PROCESSING APPARATUS AND SERVER, CONTROL METHOD, AND RECORDING MEDIUM

BACKGROUND OF THE INVENTION

1. Field of the Invention

The present invention relates to a technique for updating a version of a program to another version using an update data file of the program.

2. Description of the Related Art

An information processing apparatus such as a PC can execute various kinds of processing using programs such as applications. Such programs are provided via recording media such as CD-ROMs that record programs or are available by downloading from servers via the Internet.

Some of such programs are managed using their versions, and an update data file used to update a program to a new version due to modifications of functions and addition of new functions is provided to some programs. A program update method using such update data file includes the following two methods.

One update method is to install a program of a new version using a full update data file which fully updates a program. More specifically, a program of a previous version, which has already been installed, is uninstalled, and a program is re-installed using a full update data file as a program of a post-update version, thereby fully updating the program.

The other update method is to update a program to a new version using a differential update data file used to update only some data files to be changed of those of the program. More specifically, the differential update data file updates a program to that of a post-update version by adding differential data files required to update the program from the previous version to the post-update version to the program of the previous version or by overwriting files to be changed by corresponding files.

The update method using the differential update data file can reduce a size of data to be downloaded upon, for example, acquiring the provided update data file via the Internet, compared to the update method using the full update data file. Hence, a time required to update can be cut down.

Programs are updated not only in the aforementioned applications but also in basic software such as an OS (Operating System) required to control the operations of an information processing apparatus. Since some of programs such as applications operate using some programs provided as the basic software, such programs may often become inoperable after the basic software is updated.

Japanese Patent No. 04029448 discloses a method in which each of the basic software and a program which operates using the basic software manages a version of the other program that is applicable to that of a self program, thereby avoiding the other program from becoming inoperable. More specifically, when a post-update version of the other program is not applicable to the version of the self program at the time of updating, the other program is controlled not to be updated.

However, when the version of the other program which is applicable to that of the self program is to be managed like in Japanese Patent No. 04029448, for example, the basic software has to manage applicable versions of many programs such as applications. Also, a program whose applicable version is not stored may not be ensured to operate after another program is updated.

A program having the aforementioned dependency (dependent program) may have the following possibilities. For example, a case will be examined below wherein when the basic software such as an OS is updated, the dependent program becomes inoperable, and is updated using a differential update data file so as to enable the dependent program. At this time, when a differential update data file is tried to be installed in the inoperable dependent program, for example, a registry update process and COM (Component Object Model) registration process may often fail. More specifically, when differential update data files of a plurality of versions have to be used until the inoperable dependent program is updated to a version at which the program is operable on the basic software, update programs fail to operate due to the intervention of inoperable versions.

Furthermore, for example, a case will be examined below wherein the dependent program is installed together with a class library which is required for the operation of the dependent program and is also provided by the basic software. In such case, when the basic software is updated, the class library may also be updated, and the dependent program becomes inoperable when the class library does not have any downward compatibility. At this time, even when the dependent program is updated using a differential update data file, if a class library to be provided remains unchanged, the differential update data file does not include any data file of the class library. Hence, the dependent program is unlikely to operate.

SUMMARY OF THE INVENTION

The present invention has been made in consideration of the problems of the related arts. The present invention provides a technique for updating a second program, which becomes inoperable as a result of updating of a first program and operates using the first program, to an operable version using an appropriate update data file.

The present invention in its first aspect provides an information processing apparatus, which updates a second program, that operates using a first program, using an update data file, comprising: a storage unit configured to store the first program and the second program; an acquisition unit configured to acquire versions of the first program and the second program stored in the storage unit; a setting unit configured to set, based on compatibility information indicating operable versions of the second program in correspondence with versions of the first program and the versions acquired by the acquisition unit, one of the versions of the second program operable at the version of the stored first program as a post-update version of the stored second program; and a determination unit configured to determine update data files used to update the stored second program to the post-update version based on the post-update version, the version of the stored second program, and the compatibility information, wherein when the version of the stored second program is not a version operable at the version of the stored first program, the determination unit determines one or more update data files including a full update data file which fully updates the second program to a version of the second program operable at the version of the stored first program as the update data files used to update the second program, and when the version of the stored second program is a version operable at the version of the stored first program, the determination unit determines one or more differential update data files which do not include the full update data file and update some data files of the second program as the update data files used to update the second program.

Further features of the present invention will become apparent from the following description of exemplary embodiments (with reference to the attached drawings).

BRIEF DESCRIPTION OF THE DRAWINGS

FIG. 3 is a table showing an example of compatibility information according to the embodiment;

FIG. 9 is a flowchart of update data file determination processing according to a modification.

DESCRIPTION OF THE EMBODIMENTS

First Embodiment

A preferred embodiment of the present invention will be described in detail hereinafter with reference to the drawings. Note that an embodiment to be described below will exemplify a case in which the present invention is applied to a PC which can update a dependent program, which operates using an OS, by an update data file. However, the present invention is applicable to an arbitrary device which can update a second program, which operates using a first program, by an update data file.

Note that this embodiment will give the following description under the assumption that the PC acquires an update data file required to update a dependent program from a server on a network. However, the present invention is not limited to this. That is, the update data file of the dependent program may be recorded in, for example, a recording medium such as a CD-ROM or DVD-ROM, and may be acquired from that recording medium via an interface included in the PC.

In this specification, "full update data file" indicates a data file which fully updates a dependent program or updates a file of the dependent program, and can update the dependent program to a specific version independently of the current version of the dependent program. Also, "differential update data file" indicates a data file which updates some data file or a file of a dependent program, and can update the dependent program from a specific version to another specific version.

Figure 1:
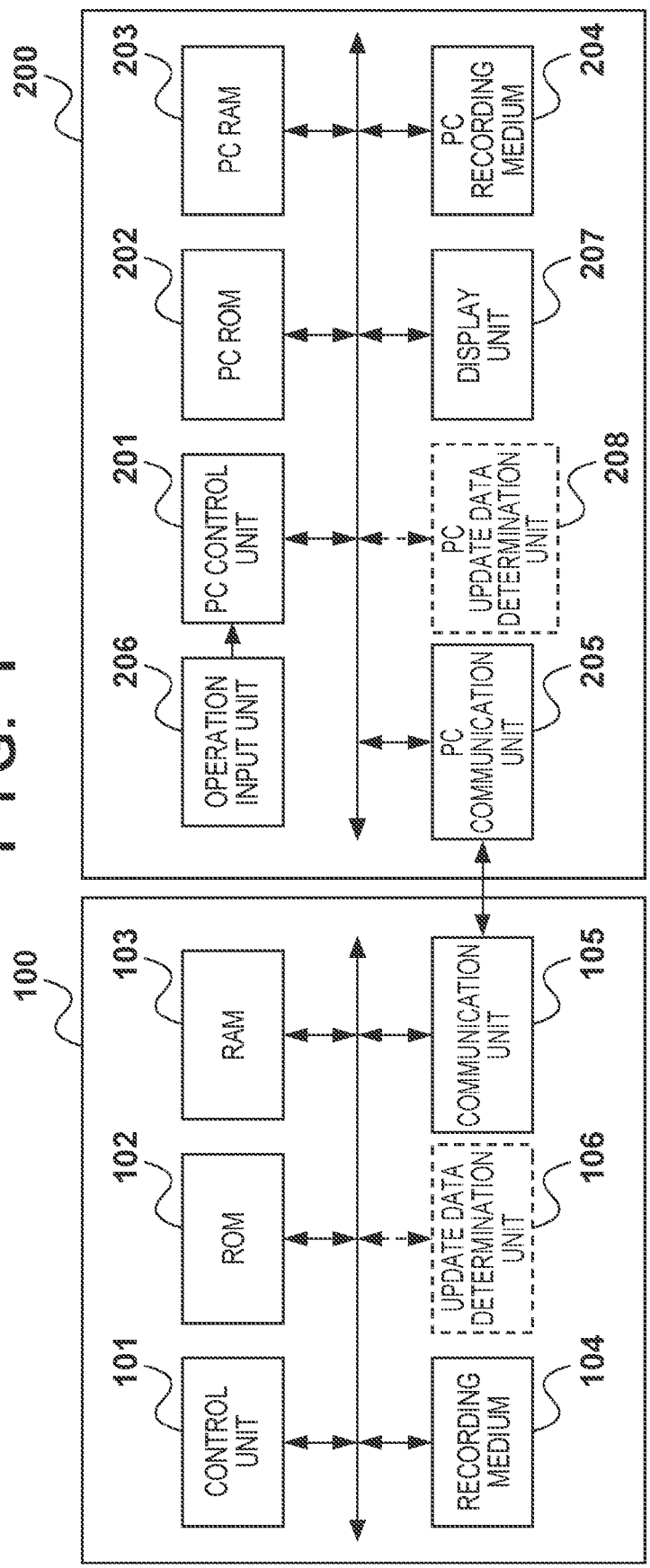
FIG. 1 is a block diagram showing the functional arrangements of a server and PC according to an embodiment of the present invention.

FIG. 1 is a block diagram showing the functional arrangements of a server 100 and PC 200 according to an embodiment of the present invention.

In a server 100, a control unit 101 is, for example, a CPU, and controls the operations of respective blocks included in the server 100. More specifically, the control unit 101 controls the operations of the respective blocks included in the server 100 by reading out operation programs of the respective blocks from a ROM 102, expanding the readout programs on a RAM 103, and executing these programs. The ROM 102 is a rewritable non-volatile memory, and stores information such as parameters required for the operations of the respective blocks included in the server 100 in addition to the operation programs of the respective blocks. The RAM 103 is a rewritable volatile memory, and is used as a storage area which temporarily stores data generated during the operations of the respective blocks included in the server 100.

Note that this embodiment will give the following description under the assumption that the operations of the respective blocks included in the server 100 are controlled by their operation programs. However, the present invention is not limited to this, and the respective blocks may be implemented by circuits which execute the same processes as the operation programs.

Figure 2A:
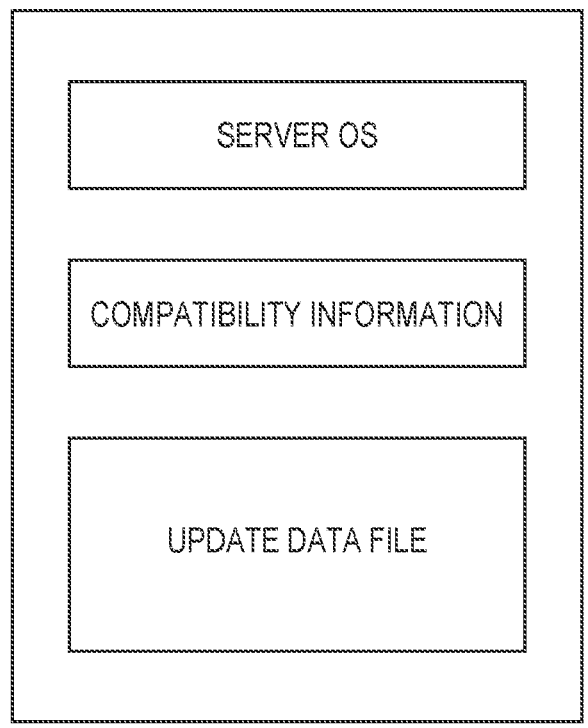
FIGS. 2A and 2B are views showing information recorded in recording media of the server and PC according to the embodiment.

A recording medium 104 is, for example, an internal memory included in the server 100, or a recording device such as an HDD or memory card, which is removably connected to the server 100. In this embodiment, assume that the recording medium 104 records information shown in FIG. 2A. More specifically, the recording medium 104 records compatibility information indicating versions of a dependent program, which are operable at corresponding versions of an OS for respective versions of the OS, which runs on the PC 200. That is, the recording medium 104 records information indicating whether or not the dependent program is operable at each version of the OS for respective versions of the dependent program, as shown in FIG. 3. Also, the recording medium 104 records two types of update data files, that is, full update data files and differential update data files, which are used to update the dependent program recorded in the PC 200 to that of another version. As the update data files, at least differential update data files are recorded in the recording medium 104 in correspondence with respective versions of the dependent program which can be provided by the server 100. For versions which are likely to be fully updated, full update data files are also recorded so that the server 100 can provide those files. Note that the compatibility information records information indicating whether or not full update data files are available in correspondence with respective versions of the dependent program.

A communication unit 105 is a communication interface which is included in the server 100 and is required to exchange data files. In this embodiment, the communication unit 105 is connected to the PC 200 via the Internet. Upon reception of an update data file request from the PC 200, the communication unit 105 transmits a requested update data file of those stored in the recording medium 104 to the PC 200 under the control of the control unit 101.

In the PC 200, a PC control unit 201 is, for example, a CPU, and controls operations of respective blocks included in the PC 200. More specifically, the PC control unit 201 controls the operations of the respective blocks included in the PC 200 by reading out operation programs of the respective blocks from a PC ROM 202, expanding the readout programs on a PC RAM 203, and executing these programs. The PC ROM 202 is a rewritable non-volatile memory, and stores information such as parameters required for the operations of the respective blocks included in the PC 200 in addition to the operation programs of the respective blocks. The PC RAM 203 is a rewritable volatile memory, and is used as a storage area which temporarily stores data generated during the operations of the respective blocks included in the PC 200.

Note that this embodiment will give the following description under the assumption that the operations of the respective blocks included in the PC 200 are controlled by their operation programs. However, the present invention is not limited to this, and the respective blocks may be implemented by circuits which execute the same processes as the operation programs.

Figure 2B:
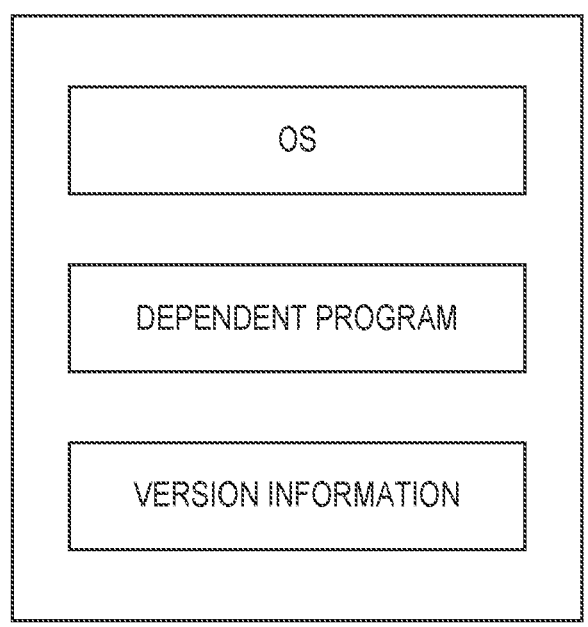

A PC recording medium 204 is, for example, an internal memory included in the PC 200, or a recording device such as an HDD or memory card, which is detachably connected to the PC 200. In this embodiment, assume that the PC recording medium 204 records information shown in FIG. 2B. The PC recording medium 204 records data of an OS and dependent program, and version information required to manage respective versions of the OS and dependent program.

A PC communication unit 205 is a communication interface which is included in the PC 200 and is required to exchange data files. In this embodiment, the PC communication unit 205 is connected to the server 100 via the Internet. When a PC update data file determination unit 208 (to be described later) determines an update data file required to update the dependent program recorded in the PC recording medium 204, the PC communication unit 205 transmits a request of the determined update data file to the server 100 under the control of the PC control unit 201. Also, the PC communication unit 205 receives the update data file which is transmitted from the server 100 in response to the transmitted update data file request.

An operation input unit 206 is, for example, a user interface such as a keyboard and mouse, which are included in the PC 200 and accept inputs from the user. The operation input unit 206 analyzes operation contents input by the user, and sends the analysis result to the PC control unit 201. A display unit 207 is a display device such as an LCD, which is included in or connected to the PC 200, and displays, for example, GUI data of the OS and dependent program.

The PC update data file determination unit 208 is a block which determines an update data file which is requested to the server 100, and is used to update the dependent program recorded in the PC 200. More specifically, the PC update data file determination unit 208 refers to the versions of the OS and dependent program recorded in the PC recording medium 204. Then, the PC update data file determination unit 208 determines an update data file to a version of the dependent program which operates at the version of the OS of the PC 200 according to the version of the dependent program, which is currently recorded in the PC recording medium 204.

(Dependent Program Update Processing)

Figure 4:
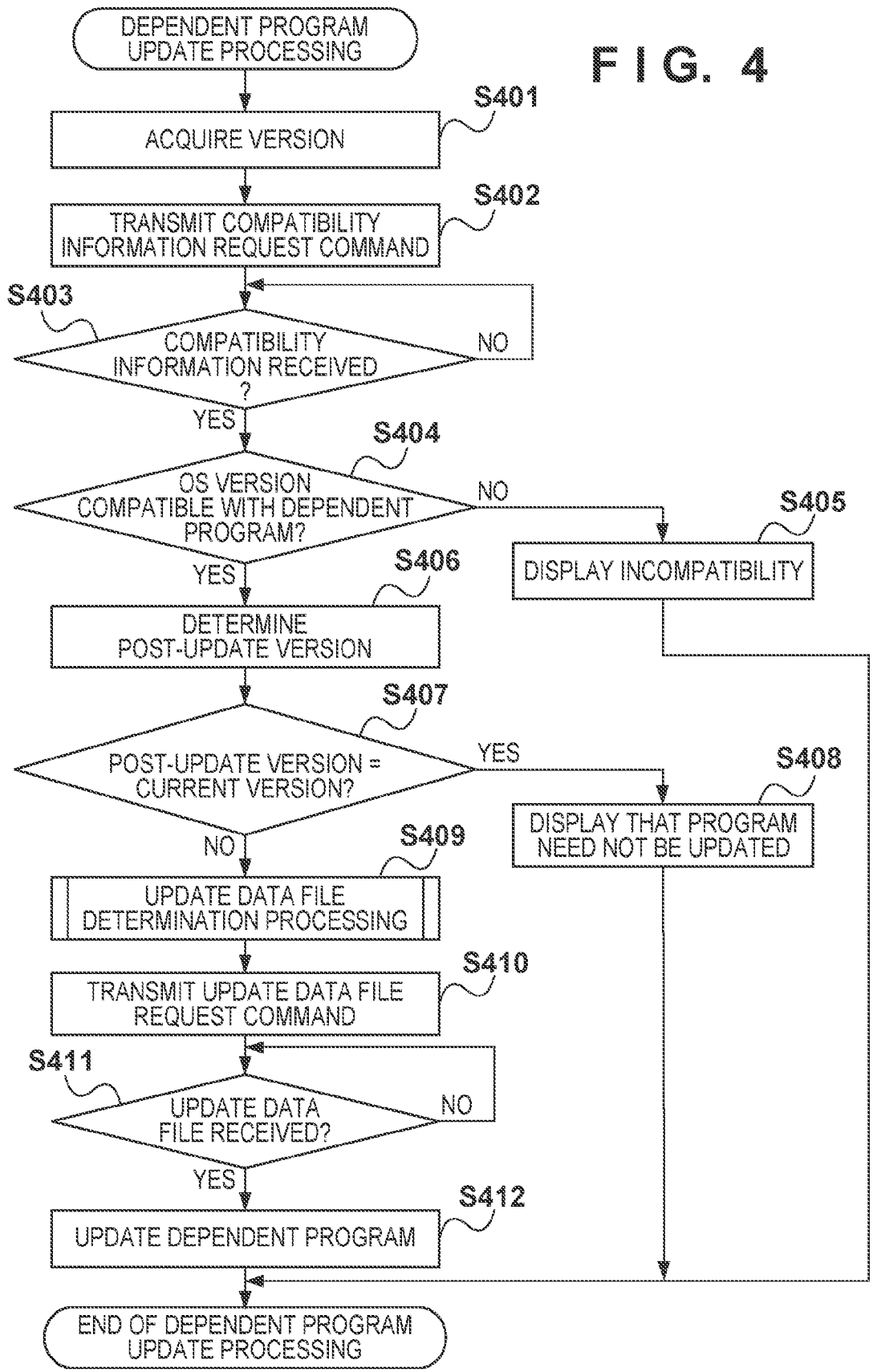
FIG. 4 is a flowchart showing dependent program update processing according to the first embodiment.

Dependent program update processing of the PC 200 of this embodiment having the aforementioned arrangement will be described in detail below with reference to the flowchart shown in FIG. 4. Processing corresponding to this flowchart can be implemented when the PC control unit 201 reads out a corresponding processing program stored in, for example, the PC recording medium 204, and expands and executes that program on the PC RAM 203. Note that the following description will be given under the assumption that this dependent program update processing is started when the dependent program is launched.

In step S401, the PC control unit 201 acquires the versions of the dependent program and OS recorded in the PC recording medium 204. More specifically, the PC control unit 201 reads out the versions of the OS and dependent program recorded in the PC recording medium 204 to acquire their versions.

In step S402, the PC control unit 201 transmits a request command, which requests the server 100 to transmit compatibility information indicating operable versions of the dependent program in correspondence with respective versions of the OS, to the server 100 via the PC communication unit 205. Then, in step S403, the PC control unit 201 pauses processing until it receives the compatibility information from the server 100 via the PC communication unit 205.

Upon reception of the compatibility information from the server 100, the PC control unit 201 judges in step S404 whether or not the received compatibility information includes information associated with the operation of the dependent program at the version of the OS in the PC 200. That is, the PC control unit 201 judges whether or not the server 100 can provide an update data file corresponding to the version of the OS. If the PC control unit 201 determines that the compatibility information includes information associated with the version of the OS in the PC 200, the PC control unit 201 advances the process to step S406; otherwise, the PC control unit 201 advances the process to step S405.

If the compatibility information does not include any information associated with the version of the OS in the PC 200, the PC control unit 201 controls the display unit 207 to display a GUI which notifies the user that the dependent program is not compatible with the version of the OS in step S405. After that, the PC control unit 201 ends the dependent program update processing.

In step S406, the PC control unit 201 determines a post-update version of the dependent program with reference to the compatibility information. More specifically, the PC control unit 201 determines, as the post-update version, the latest one of versions of the dependent program which operates at the version of the OS in the PC 200 with reference to the compatibility information. For example, when the compatibility information is configured, as shown in FIG. 3, and when the version of the OS in the PC 200 is "b", the latest one of the versions of the dependent program, which operates at the version "b", is determined as "1.4".

Note that this embodiment will explain the method of determining, as the post-update version, the latest one of the versions of the dependent program which is operable at the version of the OS. However, the present invention is not limited to such specific embodiment. That is, the post-update version of the dependent program may be that desired by the user. For example, in this step, a list of the operable versions of the dependent program may be displayed on the display unit 207, and the PC control unit 201 may prompt the user to select a desired version.

The PC control unit 201 judges in step S407 whether or not the post-update version of the dependent program determined in step S406 is different from that of the dependent program currently recorded in the PC recording medium 204. If the PC control unit 201 determines that the version of the dependent program recorded in the PC recording medium 204 is different from the determined post-update version determined in step S406, the PC control unit 201 advances the process to step S409; otherwise, the PC control unit 201 advances the process to step S408.

In step S408, since the dependent program need not be updated in this dependent program update processing, the PC control unit 201 controls the display unit 207 to display a GUI which notifies the user that the dependent program need not be updated. Then, the PC control unit 201 ends this dependent program update processing.

Figure 5:
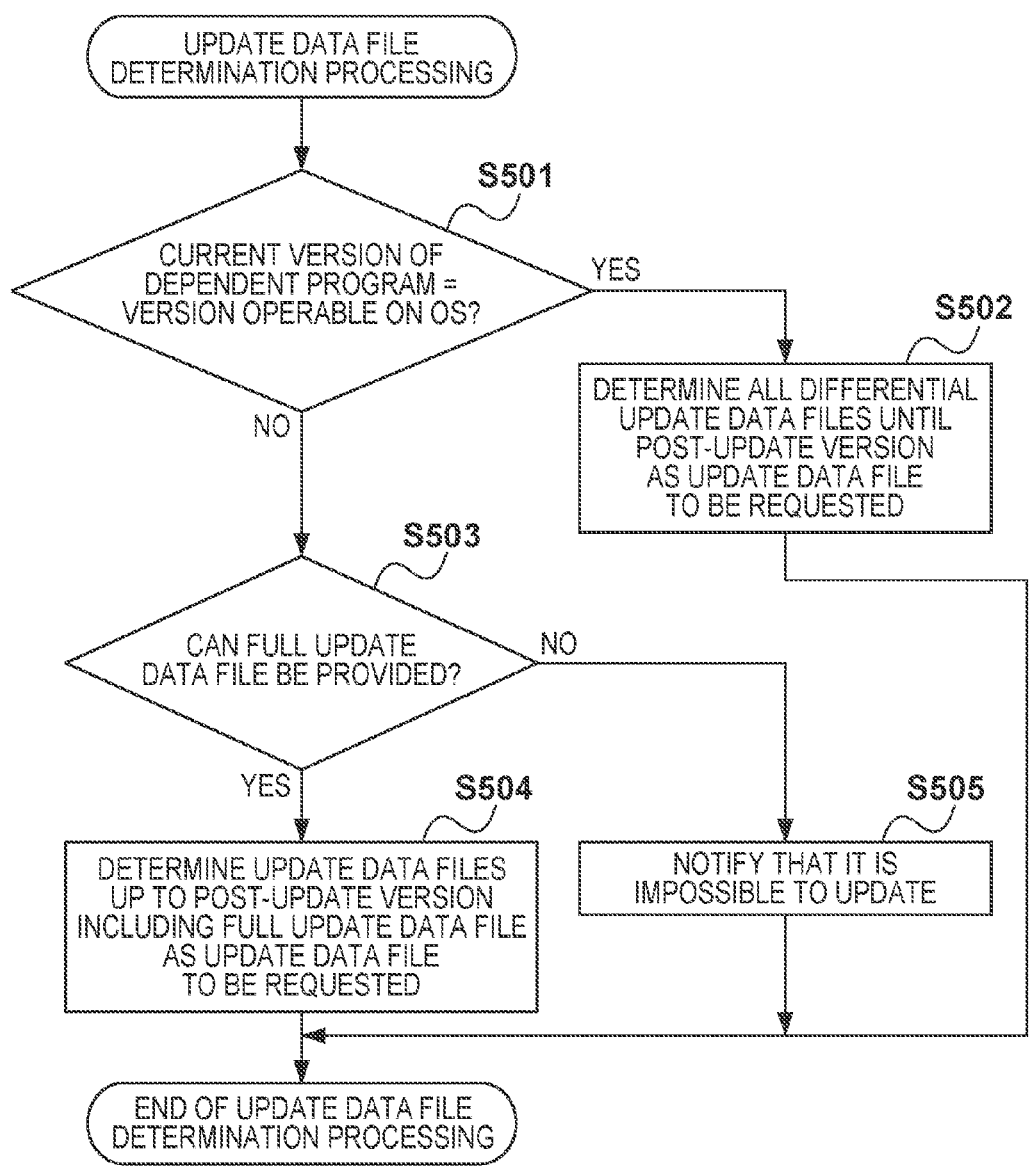
FIG. 5 is a flowchart showing update data file determination processing according to the first embodiment.

In step S409, the PC control unit 201 executes update data file determination processing for determining an update data file to be requested to the server 100. The update data file determination processing executed by the PC 200 will be described in detail below with reference to FIG. 5.

(Update Data File Determination Processing (PC))

In step S501, the PC control unit 201 inputs the versions of the OS and dependent program stored in the PC recording medium 204, the compatibility information received from the server 100, and information of the post-update version to the PC update data file determination unit 208. Then, the PC update data file determination unit 208 judges with reference to the compatibility information under the control of the PC control unit 201 whether or not the current version of the dependent program is that operable at the version of the OS in the PC 200.

That is, if the PC update data file determination unit 208 judges in this step that the current version of the dependent program is that operable at the version of the OS in the PC 200, the PC control unit 201 advances the process to step S502. On the other hand, if the PC update data file determination unit 208 judges that the current version of the dependent program is that inoperable at the version of the OS in the PC 200, the PC control unit 201 advances the process to step S503.

In step S502, the PC update data file determination unit 208 determines to request all differential update data files stored in the server 100 in correspondence with versions from the current version to the post-update version of the dependent program under the control of the PC control unit 201. That is, since the operation of the current version of the dependent program at the version of the OS in the PC 200 is ensured, the dependent program can be updated by only the differential update data files which update some data files.

The PC update data file determination unit 208 judges in step S503 under the control of the PC control unit 201 whether or not versions equal to or older than the post-update version, which are operable at the version of the OS in the PC 200, include versions at which full update data files can be provided. More specifically, the PC update data file determination unit 208 judges with reference to the compatibility information whether or not update data files corresponding to versions equal to or older than the post-update version include full update data files of versions operable at the version of the OS in the PC 200.

If the PC update data file determination unit 208 judges that versions equal to or older than the post-update version, which are operable at the version of the OS in the PC 200, include versions at which full update data files can be provided, the PC control unit 201 advances the process to step S504. On the other hand, if the PC update data file determination unit 208 judges that versions equal to or older than the post-update version, which are operable at the version of the OS in the PC 200, do not include any version at which a full update data file can be provided, the PC control unit 201 advances the process to step S505.

In step S504, the PC update data file determination unit 208 determines to request a full update data file of the latest version, which is operable on the OS, of the versions equal to or older than the post-update version of the dependent program, at which full update data files can be provided, under the control of the PC control unit 201.

Since the full update data file fully updates the dependent program independently of the current version of the dependent program, even when the current version of the dependent program is inoperable on the OS, one full update data file can update the program to an operable version. That is, after the dependent program is updated to an operable version, it can be updated up to the post-update version using only differential update data files with small data sizes as in step S502.

That is, when an update data file is to be downloaded via the Internet like in this embodiment, the data size to be downloaded is reduced to cut down a time required for the dependent program update processing. For this reason, since at least a full update data file of the latest version of those, which are operable on the OS and are equal to or older than the post-update version, and at which full update data files can be provided, is requested, a time required for the update processing is cut down.

Note that if a full update data file to the post-update version is not available, the PC update data file determination unit 208 also requests differential update data files between the full update data file to be requested and the post-update version as update data files to be requested to the server 100, as described above. That is, the PC update data file determination unit 208 determines to request a combination of update data files which include at least one full update data file operable on the version of the OS in the PC 200, and can update the dependent program to the post-update version by a minimum data size. However, the present invention is not limited to such specific embodiment. That is, even when the dependent program is currently inoperable on the OS, the present invention provides an effect that can update the dependent program using at least the full update data file operable at the version of the OS.

In step S505, the PC control unit 201 judges that the dependent program recorded in the PC recording medium 204 cannot be updated to a version operable at the version of the OS in the PC 200. Then, the PC control unit 201 controls the display unit 207 to display a GUI which notifies the user that it is impossible to update the dependent program, thus ending this update data file determination processing and dependent program update processing.

After the update data files to be requested to the server 100 are determined by the update data file determination processing in this way, the PC control unit 201 transmits a command that requests the determined update data files to be requested to the server 100 via the PC communication unit 205 in step S410. In step S411, the PC control unit 201 pauses processing until it receives the requested update data files via the PC communication unit 205.

In step S412, the PC control unit 201 updates the dependent program recorded in the PC recording medium 204 using the update data files received in step S411. More specifically, the PC control unit 201 applies the received update data files in ascending order of version, thereby updating the dependent program to the post-update version.

As described above, the information processing apparatus of this embodiment executes the following processing when it updates a second program which operates using a stored first program. More specifically, the information processing apparatus sets a post-update version based on compatibility information which indicates operable versions of the second program in correspondence with respective versions of the first program, and the versions of the first and second programs. At this time, the information processing apparatus determines an update data file used in update processing by judging whether or not the version of the stored second program is that operable on the stored first program. When the version of the second program is not that operable on the first program, one or more update data files which include a full update data file that fully updates the second program to a version of the second program operable on the first program are determined as update data files. On the other hand, when the version of the second program is that operable on the first program, one or more differential update data files which do not include any full update data file and are used to update some data files of the second program are determined as update data files.

In this manner, the information processing apparatus can update the second program which becomes inoperable as a result of updating of the first program and operates using that first program to an operable version using appropriate update data files.

Second Embodiment

The aforementioned embodiment has explained the method of determining update data files required to update the dependent program recorded in the PC 200 to a version operable at the version of the OS by the PC update data file determination unit 208 and requesting the determined files. This embodiment will explain a method of determining update data files required to update by an update data file determination unit 106 included in the server 100, and transmitting the determined files to the PC 200. That is, the PC 200 need not separately transmit two transmission requests of compatibility information and update data files to the server 100, and the PC 200 can receive optimal update data files by only one update data file request.

The functional arrangements of the server 100 and PC 200 of this embodiment are substantially the same as those of the aforementioned first embodiment, except that the update data file determination unit 106 is added to the server 100, and the PC update data file determination unit 208 is omitted from the PC 200.

The update data file determination unit 106 is a block which determines update data files which are to be transmitted to the PC 200 and are required to update the dependent program recorded in the PC 200. More specifically, the update data file determination unit 106 acquires versions of the OS and dependent program in the PC 200. Then, the update data file determination unit 106 determines update data files to a version of the dependent program which is operable at the version of the OS in the PC 200 in accordance with the version of the dependent program currently recorded in the PC 200.

(Dependent Program Update Processing)

Figure 6:
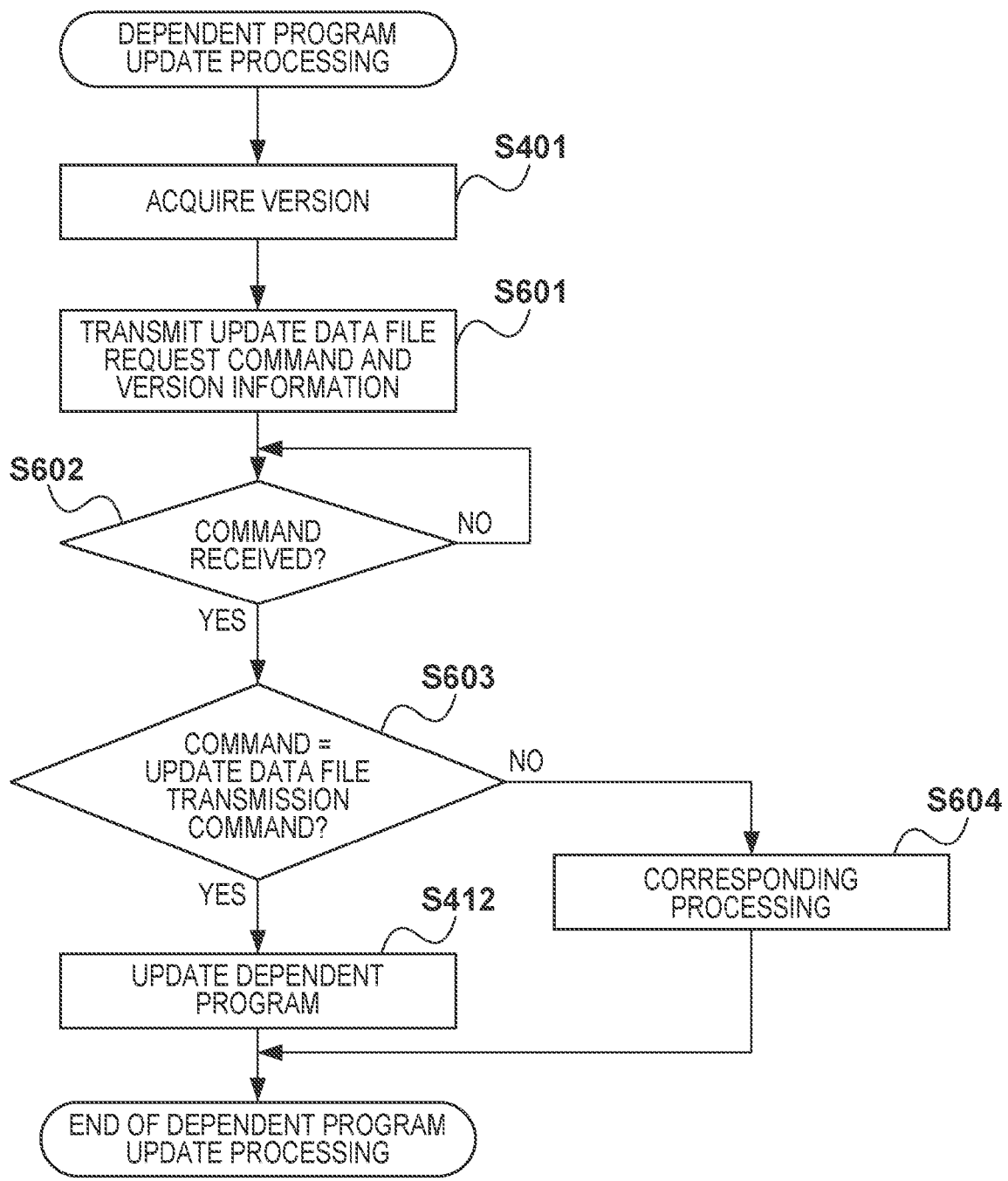
FIG. 6 is a flowchart of dependent program update processing according to the second embodiment.

Dependent program update processing of the PC 200 of this embodiment having the aforementioned arrangement will be described in detail below with reference to the flowchart shown in FIG. 6. Processing corresponding to this flowchart can be implemented when the PC control unit 201 reads out a corresponding processing program stored in, for example, the PC recording medium 204, and expands and executes that program on the PC RAM 203. Note that the following description will be given under the assumption that this dependent program update processing is started when the dependent program is launched. Also, the same reference numerals in this dependent program update processing denote blocks which execute the same processes as in the dependent program update processing of the first embodiment, and a description thereof will not be repeated. Hence, only a description of processes characteristic to this embodiment will be given.

In step S601, the PC control unit 201 transmits the versions acquired in step S401, and also a request command that requests to transmit update data files of the dependent program to the server 100 via the PC communication unit 205. In step S602, the PC control unit 201 pauses processing until it receives a command from the server 100 via the PC communication unit 205. Upon reception of a command, the PC control unit 201 advances the process to step S603.

If the PC control unit 201 judges in step S603 that the received command is that associated with transmission of update data files, the PC control unit 201 advances the process to step S412. If the PC control unit 201 judges in step S603 that the received command is that other than transmission of update data files, the PC control unit 201 advances the process to step S604 to execute processing according to the received command, thus ending the dependent program update processing.

(Update Data File Transmission Processing)

Figure 7:
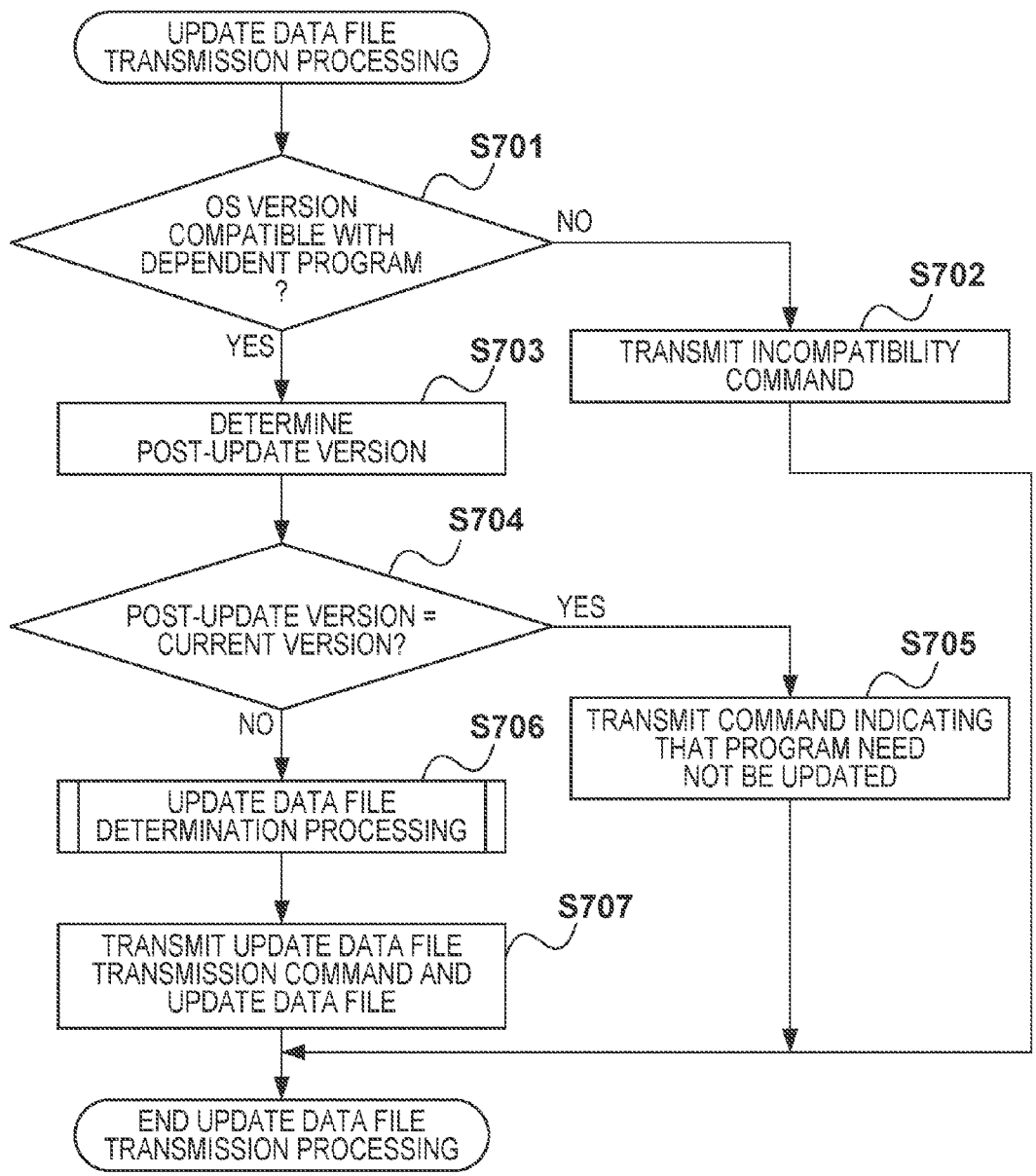
FIG. 7 is a flowchart of update data file transmission processing according to the second embodiment.

On the other hand, update data file transmission processing in the server 100 will be described in detail below with reference to the flowchart shown in FIG. 7. Processing corresponding to this flowchart can be implemented when the control unit 101 reads out a corresponding processing program stored in, for example, the ROM 102, and expands and executes that program on the RAM 103. Note that the following description will be given under the assumption that this update data file transmission processing is started, for example, when the communication unit 105 receives an update data file request command from the PC 200.

The control unit 101 judges in step S701 whether or not compatibility information recorded in the recording medium 104 includes information associated with operations of the dependent program at the version of the OS in the PC 200, which is included in the received versions. That is, the control unit 101 judges whether or not update data files compatible with the version of the OS are recorded in the recording medium 104. If the control unit 101 judges that the compatibility information includes information associated with the version of the OS in the PC 200, the control unit 101 advances the process to step S703; otherwise, the control unit 101 advances the process to step S702.

If the compatibility information does not include any information associated with the version of the OS, the control unit 101 transmits, to the PC 200 via the communication unit 105, a command indicating that the dependent program is not compatible with the version of the OS in step S702. After that, the control unit 101 ends this update data file transmission processing. Note that when the PC 200 receives that incompatibility command, the PC control unit 201 can control the display unit 207 to display GUI data indicating that the dependent program is not compatible with the version of the OS.

In step S703, the control unit 101 determines a post-update version of the dependent program recorded in the PC 200 with reference to the compatibility information. More specifically, the control unit 101 determines, as the post-update version, the latest version, of those of the dependent program, which are operable at the version of the OS in the PC 200, with reference to the compatibility information.

Note that this embodiment will explain the method of determining, as the post-update version, the latest version of those of the dependent program, which are operable at the version of the OS. However, the present invention is not limited to such specific embodiment. That is, the post-update version of the dependent program may be that desired by the user. For example, in this step, a list of operable versions of the dependent program may be transmitted to the PC 200 and may be displayed on the display unit 207, thus prompting the user to select a desired version.

The control unit 101 judges in step S704 whether or not the post-update version of the dependent program determined in step S703 is different from the version of the dependent program recorded in the PC 200. The control unit 101 refers to the version received from the PC 200. If the version of the dependent program recorded in the PC 200 is different from the post-update version determined in step S703, the control unit 101 advances the process to step S706; otherwise, the control unit 101 advances the process to step S705.

In step S705, since the dependent program need not be updated in the update data file transmission processing, the control unit 101 transmits a command indicating that the dependent program need not be updated, thus ending this update data file transmission processing. Note that when the PC 200 receives the command indicating that the dependent program need not be updated, the PC control unit 201 can control the display unit 207 to display a GUI that notifies the user that the dependent program need not be updated.

Figure 8:
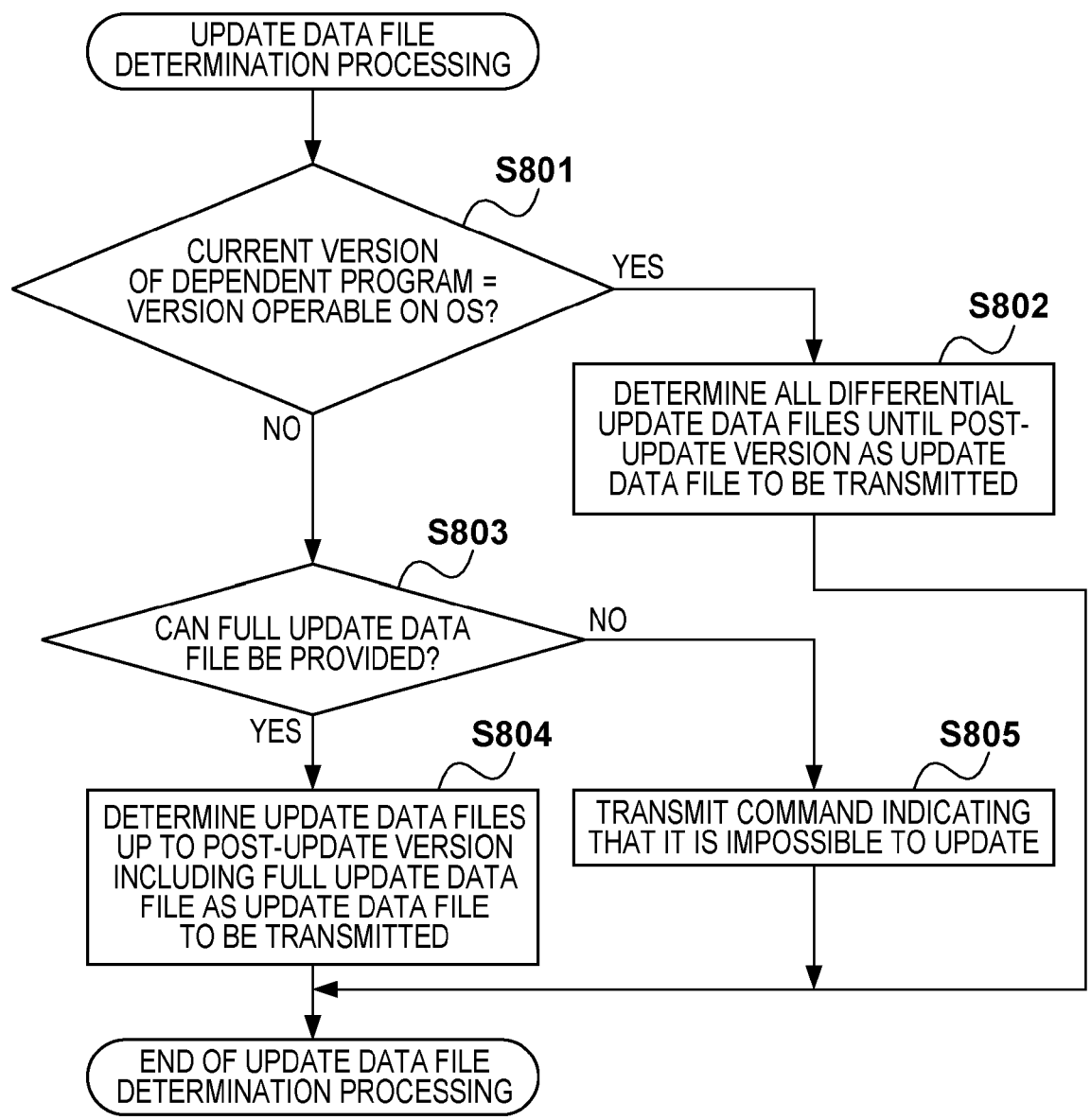
FIG. 8 is a flowchart of update data file determination processing according to the second embodiment.

In step S706, the control unit 101 executes update data file determination processing for determining update data files to be transmitted to the PC 200. The update data file determination processing executed by the server 100 will be described in detail below with reference to FIG. 8.

(Update Data File Determination Processing (Server))

In step S801, the control unit 101 inputs the received versions of the OS and dependent program stored in the PC 200, the compatibility information recorded in the recording medium 104, and information of the post-update version to the update data file determination unit 106. Then, the update data file determination unit 106 judges with reference to the compatibility information under the control of the control unit 101 whether or not the current version of the dependent program is that operable at the version of the OS in the PC 200.

That is, if the update data file determination unit 106 judges in this step that the current version of the dependent program is that operable at the version of the OS in the PC 200, the control unit 101 advances the process to step S802. On the other hand, if the update data file determination unit 106 judges that the current version of the dependent program is not that operable at the version of the OS in the PC 200, the control unit 101 advances the process to step S803.

In step S802, the update data file determination unit 106 determines to transmit all differential update data files, which are recorded in the recording medium 104 in correspondence with versions from the current version to the post-update version of the dependent program, under the control of the control unit 101. That is, since the operation of the current version of the dependent program at the version of the OS in the PC 200 is ensured, the dependent program can be updated using only differential update data files which update some data files.

The update data file determination unit 106 judges in step S803 under the control of the control unit 101 whether or not versions equal to or older than the post-update version, which are operable at the version of the OS in the PC 200, include versions at which full update data files can be provided. More specifically, the update data file determination unit 106 judges with reference to the compatibility information whether or not update data files corresponding to versions equal to or older than the post-update version include full update data files of versions operable at the version of the OS in the PC 200.

If the update data file determination unit 106 judges that versions equal to or older than the post-update version, which are operable at the version of the OS, include versions at which full update data files can be provided, the control unit 101 advances the process to step S804. On the other hand, if the update data file determination unit 106 judges that versions equal to or older than the post-update version, which are operable at the version of the OS, do not include any version at which a full update data file can be provided, the control unit 101 advances the process to step S805.

In step S804, the update data file determination unit 106 determines, under the control of the control unit 101, to transmit a full update data file of the latest version, which is operable on the OS, of the versions equal to or older than the post-update version of the dependent program, at which full update data files can be provided.

When an update data file is to be transmitted via the Internet like in this embodiment, the data size to be downloaded is reduced to cut down a time required for the dependent program update data file transmission processing. For this reason, in this embodiment, by transmitting at least a full update data file of the latest version of those, which are operable on the OS and are equal to or older than the post-update version, and at which full update data files can be provided, a time required for transmission is cut down.

Note that if a full update data file to the post-update version is not available, the update data file determination unit 106 also transmits differential update data files between the full update data file to be transmitted and the post-update version as update data files to be transmitted to the PC 200, as described above. That is, the update data file determination unit 106 determines to transmit a combination of update data files which include at least one full update data file operable at the version of the OS in the PC 200, and can update the dependent program to the post-update version by a minimum data size. However, the present invention is not limited to such specific embodiment. That is, even when the dependent program is currently inoperable on the OS, the present invention provides an effect that can update the dependent program by transmitting at least the full update data file operable at the version of the OS.

In step S805, the control unit 101 judges that the dependent program recorded in the PC 200 cannot be updated to a version operable at the version of the OS in the PC 200. Then, the control unit 101 transmits a command indicating that it is impossible to update the dependent program to the PC 200 via the communication unit 105, thus ending this update data file determination processing and update data file transmission processing. Note that when the PC 200 receives the command indicating that it is impossible to update the dependent program, the PC control unit 201 can control the display unit 207 to display a GUI which notifies the user that it is impossible to update the dependent program.

After the update data files to be transmitted to the PC 200 are determined by the update data file determination processing in this way, the control unit 101 transmits the determined update data files to the PC 200 via the communication unit 105 together with a command indicating that the determined update data files are to be transmitted in step S707.

As described above, the server of this embodiment executes the following processing when it receives, from the information processing apparatus, a request of update data files required to update a second program which operates using a first program. More specifically, the server sets a post-update version based on compatibility information which indicates operable versions of the second program in correspondence with respective versions of the first program, and the versions of the first and second programs. At this time, the server determines an update data file to be transmitted to the information processing apparatus by judging whether or not the version of the second program stored in the information processing apparatus is that operable on the first program stored in the information processing apparatus. When the version of the second program is not that operable on the first program, one or more update data files which include a full update data file that fully updates the second program to a version of the second program operable on the first program are determined as update data files to be transmitted. On the other hand, when the version of the second program is that operable on the first program, one or more differential update data files which do not include any full update data file and are used to update some data files of the second program are determined as update data files to be transmitted.

In this manner, the information processing apparatus can update the second program, which becomes inoperable as a result of updating of the first program and operates using that first program, to an operable version using appropriate update data files received from the server.

Note that the aforementioned first and second embodiments have explained the case in which the first program is the OS. However, as can be easily understood from the above description, the present invention is not limited to such specific embodiments. That is, the first program may be a program such as an application (for example a browser) or library, which can serve as a platform of another program, and the present invention is applicable to such first program as long as the second program operates utilizing that first program.

(Modification)

In the descriptions of the aforementioned first and second embodiments, in the update data file determination processing, whether update data files include only differential update data files or those including a full update data file is judged by judging whether or not the current version of the dependent program is that operable at the version of the OS in the PC 200 (step S501 or S801). However, the present invention is not limited to such specific update data file determination method.

As described above, a full update data file has a data size larger than a differential update data file, and requires much time to exchange update data files. For this reason, when update data files include only differential update data files, a total data size can be reduced, and a time required to exchange update data files can be cut down.

This modification will explain a method of determining update data files to be provided by judging whether or not update data files can be provided by only differential update data files.

(Update Data File Determination Processing (PC))

The update data file determination processing of the PC 200 of this modification will be described in detail below with reference to the flowchart shown in FIG. 9. Processing corresponding to this flowchart can be implemented when the PC control unit 201 reads out a corresponding processing program stored in, for example, the PC recording medium 204, and expands and executes that program on the PC RAM 203. Note that the same step numbers in the update data file determination processing of this modification denote the steps which execute the same processes as those in the aforementioned first embodiment, and a description thereof will not be repeated. Hence, only a description of steps characteristic to this modification will be given. Note that this modification will explain the update data file determination processing of the PC 200. However, as can be readily understood from the above description, this modification can be similarly applied to the update data file determination processing of the server 100 of the second embodiment.

In step S901, the PC control unit 201 inputs the versions of the OS and dependent program stored in the PC recording medium 204, the compatibility information received from the server 100, and information of the post-update version to the PC update data file determination unit 208. Then, the PC update data file determination unit 208 makes the following judgment processing for each of all differential update data files required to update the dependent program from the current version to the post-update version with reference to the compatibility information under the control of the PC control unit 201. The PC update data file determination unit 208 judges whether or not a version of the dependent program updated by each differential update data file is that operable at the version of the OS in the PC 200. Then, if the PC update data file determination unit 208 judges that all the versions of the dependent program after they are updated by all the differential update data files required to update the dependent program from the current version to the post-update version are those operable at the version of the OS in the PC 200, the PC control unit 201 advances the process to step S502. On the other hand, if the PC update data file determination unit 208 judges that the versions of the dependent program, which are updated by any of the differential update data files required to update the dependent program from the current version to the post-update version, include those inoperable at the version of the OS in the PC 200, the PC control unit 201 advances the process to step S503.

In this way, for example, even when the versions of the dependent program, which are operable at the version of the OS in the PC 200 are "1.1 to 1.2" and "1.4 to 1.6", that is, even when they include some inoperable versions, whether update data files include only differential update data files or have to include a full update data file can be appropriately judged, and update data files can be determined.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application No. 2010-264293, filed Nov. 26, 2010, and No. 2011-240662, filed Nov. 1, 2011, which are hereby incorporated by reference herein in their entirety.

What is claimed is:

1. An information processing apparatus, which updates a second program, that operates using a first program, using an update data file, comprising:

a storage unit configured to store the first program and the second program, wherein versions of the second program, which are operable on the first program, are defined for respective versions of the first program;

an acquisition unit configured to acquire information indicating versions of the first program and the second program currently stored in said storage unit and a post-update version of the second program; and a determination unit configured to determine update data files used to update the currently stored second program to the post-update version based on the information acquired by said acquisition unit, wherein when the version of the currently stored second program is not a version operable at the version of the currently stored first program, said determination unit determines one or more update data files including a full update data file which is used, after uninstalling the currently stored second program from said storage unit, for re-installing the second program having a version operable at the version of the currently stored first program as the update data files used to update the currently stored second program, and when the version of the currently stored second program is a version operable at the version of the currently stored first program, said determination unit determines one or more differential update data files which do not include the full update data file and update some data files of the second program as the update data files used to update the currently stored second program.

2. The apparatus according to claim 1, further comprising:
a communication unit configured to communicate with a server; and
a request unit configured to request the server to transmit the update data files, which are determined by said determination unit and are used to update the second program, via said communication unit.

3. The apparatus according to claim 2, wherein said determination unit acquires compatibility information from the server via said communication unit.

4. The apparatus according to claim 1, further comprising a setting unit configured to prompts a user to select the post-update version of the second program from versions of the second program operable at the version of the currently stored first program.

5. A control method of an information processing apparatus which comprises a storage unit that stores a first program and a second program which operates using the first program, and updates the second program using an update data file, the method comprising:

an acquisition step of acquiring information indicating versions of the first program and the second program currently stored in the storage unit and a post-update version of the second program, wherein versions of the second program, which are operable on the first program, are defined for respective versions of the first program;

a determination step of determining update data files used to update the currently stored second program to the post-update version based on the information acquired by said acquisition step, wherein in the determination step, when the version of the currently stored second program is not a version operable at the version of the currently stored first program, one or more update data files including a full update data file which is used after uninstalling the currently stored second program from said storage unit, for re-installing the second program having a version operable at the version of the currently stored first program are determined as the update data files used to update the currently stored second program, and when the version of the currently stored second program is a version operable at the version of the currently stored first program, one or more differential update data files which do not include the full update data file and update some data files of the second program are determined as the update data files used to update the currently stored second program.

6. A recording medium recording a program for controlling a computer to function as respective units of an information processing apparatus of claim 1.

7. An information processing apparatus, which updates a second program, that operates using a first program, using an update data file, comprising:

a storage unit configured to store the first program and the second program, wherein versions of the second program, which are operable on the first program, are defined for respective versions of the first program;

an acquisition unit configured to acquire information indicating versions of the first program and the second program currently stored in said storage unit and a post-update version of the second program; and a determination unit configured to determine update data files used to update the currently stored second program to the post-update version based on the information acquired by said acquisition unit, wherein for all of one or more differential update data files required to update the currently stored second program to the post-update version, when all versions of the second program updated by only the respective differential update data files are versions operable at the version of the currently stored first program, said determination unit determines the one or more differential update data files as the update data files used to update the currently stored second program, and when versions of the second program updated by any of the one or more differential update data files include versions inoperable at the version of the currently stored first program, said determination unit determines one or more update data files including a full update data file which is used, after uninstalling the currently stored second program stored from said storage unit, for re-installing the second program having a version operable at the version of the currently stored first program as the update data files used to update the currently stored second program.

8. The apparatus according to claim 7, further comprising:
a communication unit configured to communicate with a server; and
a request unit configured to request the server to transmit the update data files, which are determined by said determination unit and are used to update the second program, via said communication unit.

9. A control method of an information processing apparatus which comprises a storage unit that stores a first program and a second program which operates using the first program, and updates the second program using an update data file, the method comprising:

an acquisition step of acquiring information indicating versions of the first program and the second program currently stored in the storage unit, wherein versions of the second program, which are operable on the first program, are defined for respective versions of the first program;

a determination step of determining update data files used to update the currently stored second program to the post-update version based on the information acquired by said acquisition step, wherein in the determination step, for all of one or more differential update data files required to update the currently stored second program to the post-update version, when all versions of the second program updated by only the respective differential update data file are versions operable at the version of the currently stored first program, the one or more differential update data files are determined as the update data files used to update the currently stored second program, and when versions of the second program updated by any of the one or more differential update data files include versions inoperable at the version of the currently stored first version, one or more update data files including a full update data file which is used after uninstalling the currently stored second program from said storage unit, for re-installing the second program having a version operable at the version of the currently stored first program are determined as the update data files used to update the currently stored second program.

10. A server comprising:
a communication unit configured to communicate with an information processing apparatus which stores a first program and a second program that operates using the first program, wherein versions of the second program, which are operable on the first program, are defined for respective versions of the first program;
an acquisition unit configured to acquire information indicating versions of the first program and the second program currently stored in the information processing apparatus and a post-update version of the second program a determination unit configured to determine update data files used to update the currently stored second program to the post-update version based on information acquired by said acquisition unit; and
a transmission unit configured to transmit the update data files, which are determined by said determination unit and are used to update the currently stored second program, to the information processing apparatus via said communication unit,
wherein when the version of the currently stored second program is not a version operable on the currently stored first program, said determination unit determines one or more update data files which include a full update data file that is used, after uninstalling the currently stored second program from the information processing apparatus, for re-installing the second program having a version operable at the version of the currently stored first program as the update data files used to update the currently stored second program, and
when the version of the currently stored second program is a version operable on the currently stored first program, said determination unit determines one or more differential update data files which do not include the full update data file and update some data files of the second program as the update data files used to update the currently stored second program.

11. The server according to claim 10, further comprising a setting unit configured to prompt a user to select the post-update version of the second program from versions of the second program operable at the version of the currently stored first program.

12. A control method of a server, which comprises a storage unit that stores update data files used to update a second program that operates using a first program to respective versions in correspondence with the respective versions of the second program, the method comprising:
a communication step of communicating with an information processing apparatus which stores the first program and the second program;
an acquisition step of acquiring information indicating versions of the first program and the second program currently stored in the information processing apparatus and a post-update version of the second program, wherein versions of the second program, which are operable on the first program, are defined for respective versions of the first program;
a determination step of determining update data files used to update the currently stored second program to the post-update version based on information acquired by said acquisition step; and a transmission step of transmitting the update data files, which are determined in the determination step and are used to update the currently stored second program, to the information processing apparatus via the communication step,
wherein in the determination step,
when the version of the currently stored second program is not a version operable on the currently stored first program, one or more update data files which include a full update data file that is used after uninstalling the currently stored second program from the information processing apparatus, for re-installing the second program having a version operable at the version of the currently stored first program stored in the information processing apparatus are determined as the update data files used to update the currently stored second program, and
when the version of the currently stored second program is a version operable on the currently stored first program, one or more differential update data files which do not include the full update data file and update some data files of the second program are determined as the update data files used to update the currently stored second program.

13. A computer-readable recording medium recording a program for controlling a computer to function as respective units of a server of claim 10.

14. A server comprising:
a communication unit configured to communicate with an information processing apparatus which stores a first program and a second program that operates using the first program, wherein versions of the second program, which are operable on the first program, are defined for respective versions of the first program;
an acquisition unit configured to acquire information indicating versions of the first program and the second program currently stored in the information processing apparatus and a post-update version of the second program;
a determination unit configured to determine update data files used to update the currently stored second program to the post-update version based on the information acquired by said acquisition unit; and
a transmission unit configured to transmit the update data files, which are determined by said determination unit and are used to update the currently stored second program, to the information processing apparatus via said communication unit,
wherein for all of one or more differential update data files required to update the currently stored second program to the post-update version, when all versions of the second program updated by only the respective differential update data files are versions operable at the version of the currently stored first program, said determination unit determines the one or more differential update data files as the update data files used to update the currently stored second program, and
when versions of the second program updated by any of the one or more differential update data files include versions inoperable at the version of the currently stored first program, said determination unit determines one or more update data files including a full update data file which is used, after uninstalling the currently stored second program from the information processing apparatus, for re-installing the second program having a version operable at the version of the currently stored first program as the update data files used to update the currently stored second program.

15. A control method of a server, which comprises a storage unit that stores update data files used to update a second program that operates using a first program to respective versions in correspondence with the respective versions of the second program, the method comprising:
- a communication step of communicating with an information processing apparatus which stores the first program and the second program;
- an acquisition step of acquiring information indicating versions of the first program and the second program currently stored in the information processing apparatus and a post-update version of the second program, wherein versions of the second program, which are operable on the first program, are defined for respective versions of the first program;
- a determination step of determining update data files used to update the currently stored second program to the post-update version based on the information acquired by said acquisition step; and
- a transmission step of transmitting the update data files, which are determined in the determination step and are used to update the currently stored second program, to the information processing apparatus via the communication step, wherein in the determination step, for all of one or more differential update data files required to update the currently stored second program to the post-update version, when all versions of the second program updated by only the respective differential update data files are versions operable at the version of the currently stored first program, the one or more differential update data files are determined as the update data files used to update the currently stored second program, and when versions of the second program updated by any of the one or more differential update data files include versions inoperable at the version of the currently stored first program, one or more update data files including a full update data file which is used after uninstalling the currently stored second program from the information processing apparatus, for re-installing the second program having a version operable at the version of the currently stored first program are determined as the update data files used to update the currently stored second program.

* * * * *